United States Patent [19]

van der Vegte et al.

[11] Patent Number: 4,684,212
[45] Date of Patent: Aug. 4, 1987

[54] DETACHABLE OPTICAL CONNECTOR

[75] Inventors: Jan van der Vegte; Dirk G. Hek, both of Hilversum, Netherlands

[73] Assignee: U.S. Philips Corporation, New York, N.Y.

[21] Appl. No.: 270,161

[22] Filed: Jun. 3, 1981

[30] Foreign Application Priority Data

Jun. 19, 1980 [NL] Netherlands .......................... 8003545

[51] Int. Cl.⁴ .............................................. G02B 6/38
[52] U.S. Cl. .................................................. 350/96.21
[58] Field of Search ................ 350/96.20, 96.21, 96.22

[56] References Cited

U.S. PATENT DOCUMENTS

| 4,050,783 | 9/1977 | Tardy | 350/96.21 |
| 4,183,619 | 1/1980 | Makuch | 350/96.21 |
| 4,192,575 | 3/1980 | Hodge | 350/96.21 |
| 4,223,979 | 9/1980 | Piter et al. | 350/96.21 |
| 4,289,374 | 9/1981 | Franken et al. | 350/96.20 |

FOREIGN PATENT DOCUMENTS 2007868 5/1979 United Kingdom .
2033104 5/1980 United Kingdom .

Primary Examiner—Robert E. Wise
Attorney, Agent, or Firm—Marc D. Schechter

[57] ABSTRACT

An optical connector for coupling pairs of optical fibers. The connector comprises a multi-part housing accommodating two pin holders. Each pin holder encloses one or three pins which enclose an elongate duct for accommodating one end of an optical fiber. The pins are aligned with respect to each other by means of a coupling bushing. A set of pins projects beyond a first housing part and is protected by a protective cap which is detachably mounted on the housing part and which projects beyond the end of the set of pins. A coupling bushing is arranged on the pins inside the protective cap. A collar formed on the protective cap keeps the coupling bushing in position. The protective cap also serves for precentering during the assembly of the connector. To this end, the protective cap forms a smooth fit with a recess in a second housing part within which the second, mating pin holder is accommodated. One of the pin holders, and hence the set of pins is preferably arranged to be resilient in the longitudinal direction.

8 Claims, 6 Drawing Figures

DETACHABLE OPTICAL CONNECTOR

BACKGROUND OF THE INVENTION

The invention relates to a detachable connector for the coupling ends of pairs of optical fibers. The connector comprises first and second pin holders. Each pin holder comprises a bore for clamping corresponding first and second fiber guides, each formed of at least one pin. Each fiber guide encloses an elongate duct which serves to accommodate an optical fiber end. The connector further comprises coupling means, which comprises a circularly cylindrical duct for enclosing non-clamped ends of the fiber guides when the connector is coupled, in order to align the ducts enclosed by the fiber guides, with respect to each other.

A connector of this kind is known from United Kingdom Pat. No. 2,007,868A (corresponding to Offenlegungsschrift No. 2,844,744). The fiber guide (in the form of three pins between which is arranged the end of the optical fiber) in the connector described in that patent is not protected against shocks and the like after the coupling has been broken. Particularly when the connection is established, the end face of the fiber end is susceptible to be damaged because the end face of the optical fiber must coincide substantially with the end faces of the three pins in order to realize a reliable coupling between two optical fibers.

Furthermore, it is not certain on which fiber guide the coupling means (a coupling bushing which is pressed onto the ends of the pins) remains when the fiber guides are pulled out of the coupling means. When a large number of connections have to be broken and restored again in a different manner such uncertainty is very disadvantageous, because in such a case two parts of a connector in which either (i) none of the parts comprise a coupling means, or (ii) both of the parts comprise a coupling means, will be brought together more often. In the latter case one of the coupling means has to be removed, which increases the risk of contamination and the risk of loss. The described situation occurs notably in telephone exchanges. Here, an optical cable which comprises a plurality of optical fibers and which enters a signal transmission rack has to be interconnected, via a distribution panel, with various electrical plug-type circuit boards which are arranged in the transmission rack or in a neighboring transmission rack.

SUMMARY OF THE INVENTION

It is an object of the invention to provide a connector which reduces the risk of damaging the end face of an optical fiber or of the fiber guide and in which the coupling means always remains on the same fiber guide.

The invention provides a connector in which the first and second pin holders are secured in first and second separate supports. The first support has a recess within which the free end of the first fiber guide is wholly located. The free end of the second fiber guide projects beyond the second support. A protective cap encloses the second fiber guide and the coupling means, and projects beyond the free end of the second fiber guide. The protective cap has inwardly projecting means to retain the coupling means between the pin holder and the projecting means. The protective cap has external dimensions complementary to the internal dimensions of the recess in the first support.

The protective cap performs the following functions. It protects the fiber guide and the end face of the fiber end against damage by shock and the like. The protective cap, forming a fit in cooperation with the recess in the second support, also serves for the preliminary centering of the fiber guide with respect to the duct in the coupling means. The protective cap also retains the coupling means on the desired fiber guide due to the collar formed thereon. Furthermore, the protective cap is detachable, so that after the removal of the coupling means, the end face of the fiber end and the coupling means itself can be cleaned.

DESCRIPTION OF THE PREFERRED EMBODIMENTS

Figure 1:
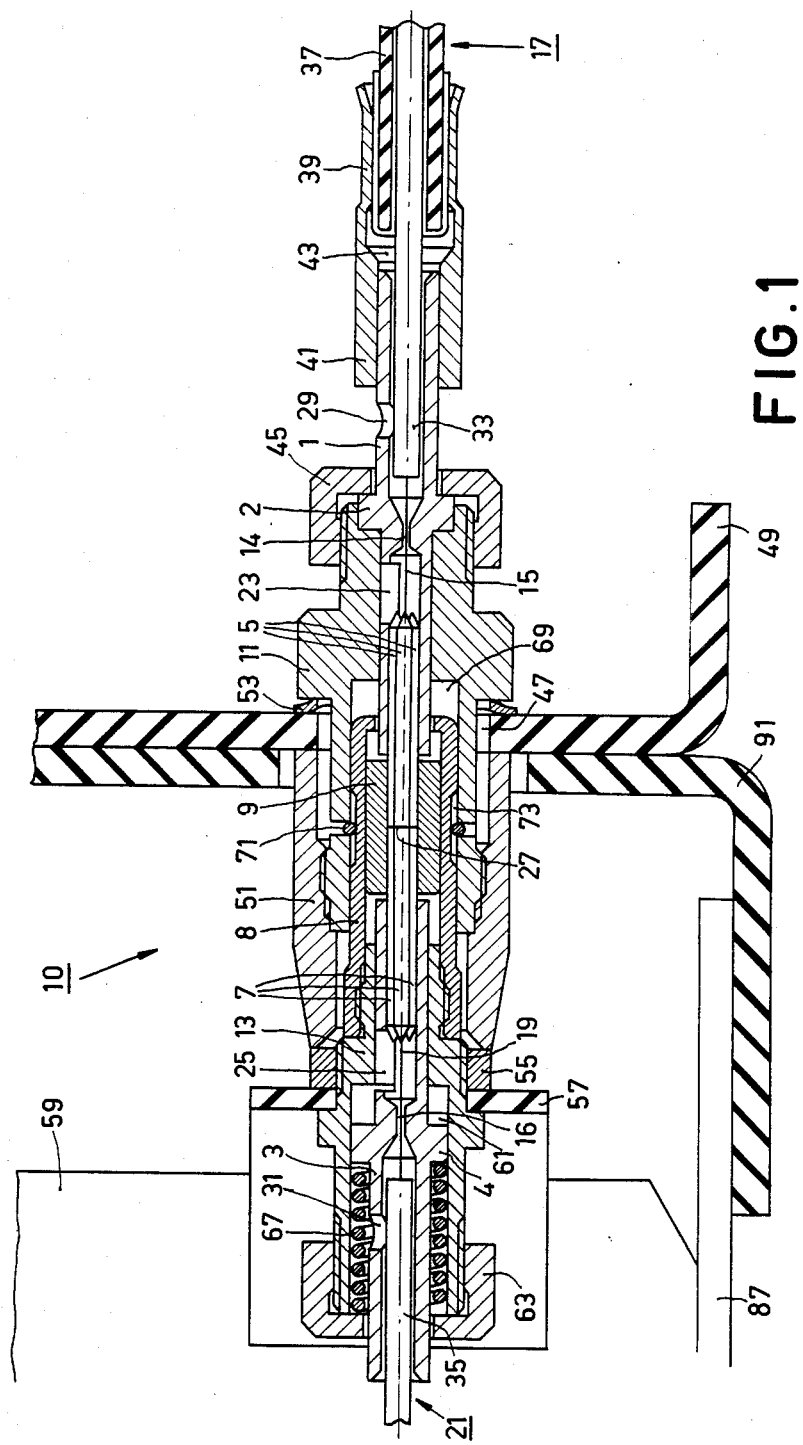
FIG. 1 is a longitudinal cross-sectional view of a first connector according to the invention.

The connector 10 shown in FIG. 1 comprises two pin holders 1 and 3, six pins 5 and 7 (three of which are clamped in each pin holder 1 and 3), a protective cap 8, a coupling means 9 in the form of a bushing, and a connector housing. The connector housing comprises a first support 11, a second support 13 and further fixing means yet to be described. The pins 5 and 7, pressed into the pin holders 1 and 3, enclose an elongate duct in which a fiber end 15 or 19 of optical cable 17 or 21 is secured.

The circularly cylindrical pin holders 1 and 3 each comprise a bore which comprises a funnel-shaped inlet opening 14 and 16 approximately in the center of the pin holder in order to facilitate the insertion of the fiber ends 15 and 19 into the duct formed by the pins 5 and 7. Furthermore, approximately at the middle of the pin holders 1 and 3 there is provided a collar 2 and 4 for securing the pin holders 1 and 3 in the supports 11 and 13.

The pin holders 1 and 3 each comprise an opening 23 and 25 in which, after the fiber end has been inserted between the pins, a drop of acryle glue is deposited on the conical ends of the pins 5 and 7. The glue penetrates between the pins 5 and 7 by capillary action. When a quickly setting glue is used, the glue will set before it reaches the end face 27 of the pins 5 and 7 (and hence the end face of the fiber ends 15 and 19), so that the end face of the fibers will not be contaminated by the glue. Because the end face of the fiber remains clean during the mounting of the fiber, after-treatment of the fiber end faces (such as polishing) is not necessary. The pin holders 1 and 3 each comprise a further opening 29 and 31 through which a secondary jacket 33 and 35 can be glued into the pin holder 1 and 3. The fiber ends 15 and 19 are thus mechanically relieved of strain.

The optical cable 17 comprises a protective jacket 37 on which a hexagonal shrink bushing 39 is secured. One end 41 of bushing 39 is clamped onto the pin holder 1 in order to realize a reliable mechanical connection between the optical cable 17 and the connector 10. The shrink bushing 39 furthermore comprises a funnel-shaped constriction 43 in order to facilitate the introduction of an optical fiber end 15 into the pin holder 1.

The pin holder 1 is rigidly connected to support 11 by a coupling nut 45 which clamps the collar 2 into a recess in the support 11. The support 11 is secured in a hole 47 in a mounting plate 49 by means of a fixing cap 51. A cup spring 53 is arranged between the mounting plate 49 and a rim formed on the support 11 in order to allow the support 11 some freedom of movement when the connector 10 is assembled.

The support 13 is secured, by way of a fixing ring 55, on an angle section 57 which is mounted on a plug-type printed circuit board 59. The pin holder 3 is resiliently mounted inside the support 13. To this end, the support 13 comprises a recess 61 which is closed by means of a cap 63. A helical spring 67 is clamped between the cap 63 and a collar 4 formed on the pin holder 3.

When the connector 10 is assembled, the protective cap 8 is secured on the support 11 and protects the end faces of the pins 7 and the optical fiber situated therebetween. Protective cap 8 also retains the coupling means 9 on the pins 7 and performs preliminary centering of the pin holders 1 and 3 and hence the pins 5 and 7. The external dimensions of protective cap 8 are complementary to the internal dimensions of a recess 69 formed in the support 11.

Subsequently in the assembly of the connector, the coupling bushing 9 slides over the three pins 5. The coupling bushing has a locating ridge for this purpose. When the ends of the pins 5 and 7 touch each other and the support is moved further, the helical spring 67 will be compressed. When the protective cap 8 with the support 13 has been moved far enough into the support 11, a lock spring 71 engages a recess 73 provided in the protective cap 8. This is necessary to prevent, after the release of the support 13 (or the plug-type circuit board 59), the connection from being broken by the force of the helical spring 67. The length of recess 73 is chosen in order to compensate for dimensional tolerances, as will be explained hereinafter.

Figure 2:
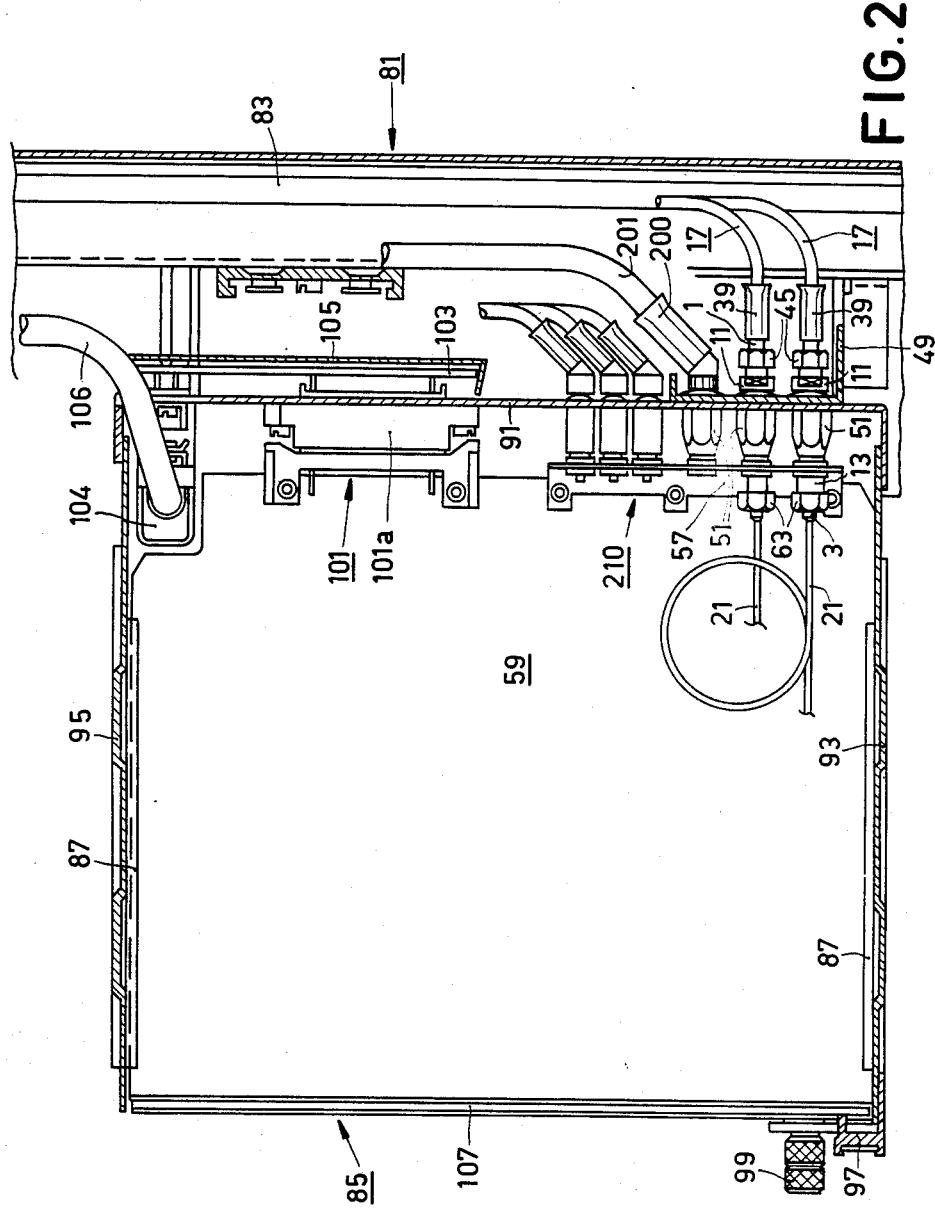
FIG. 2 shows a part of a transmission rack in which the optical connector of FIG. 1 is mounted.

FIG. 2 shows a part of a transmission rack 81 which comprises a frame 83 on which several cabinets 85 are mounted one over the other. Each cabinet 85 comprises a number of plug-type circuit boards 59 (from 5 to 24) which are slid into board guides 87 and which are adjacently situated in the cabinet 85. FIG. 2 is a sectional view of merely one cabinet 85 and a front view of a board 59. The cabinet 85 comprises a rear wall 91, a top plate 93 and a bottom plate 95, and two side walls (not visible in the Figure). In order to simplify the mounting, a part (51, 11, 45, 39) of each connector 10 with the optical cable 17 connected thereto is secured to a mounting plate 49. Coaxial plugs 200 with associated cables 201 are also secured to mounting plate 49. Plate 49 is mounted on the transmission rack 81.

The rear wall 91 of the cabinet 85 comprises holes which register with the fixing caps 51 of the optical connector(s) 10 and of the coaxial plugs 200, so that the cabinet 85 can be mounted on the frame 83. After mounting the cabinet 85, the various plug-type boards 59 can be slid into the cabinet 85 via the guides 87.

After the desired plug-type boards 59 have been arranged in the cabinet 85, a rail 97 which keeps the boards 59 in position is secured to the side panels by way of two bolts 99. The board 59 is connected to a connection board 103 via a printed circuit board connector 101, which provides the necessary electrical (low-frequency) connections between the boards 59 arranged in the cabinet 85. A part 101a of the connector 101 is mounted on the rear wall 91 on which the connection panel 103 and a shielding plate 105 are also mounted. The plug-type board 59 is furthermore connected to further boards accommodated in the cabinet 85 via coaxial (h.f.) connections 210. The various plug-type boards 59 in the cabinet 85 are powered via the connection board 103 which is connected, via a multiple plug 104, to a cable 106. Cable 106 comprises inter alia power supply conductors. Furthermore, conductors of the cable 106 are used for transmitting low frequency signals between the boards 59 in the various cabinets 85 and the various racks 81.

It is to be noted that the connections between the boards 59 themselves in the cabinet 85 are coaxial connections 210 in the present example, but the connections 210 can alternately be realized by means of optical plugs and cables.

The plug-type board 59 comprises a front plate 107 which bears against the rail 97 and which often comprises (not shown in the Figure) test points in the form of coaxial or optical plug connectors for the testing of the electrical and/or electro-optical circuits on the board 59.

Due to unavoidable dimensional tolerances, the distance between the front panel 107 and the rear wall 91 will never be exactly the same in the various cabinets 85. Moreover, the dimensions of the boards 59, the angle section 57 on which the optical and coaxial connectors are mounted and the mounting thereof on each other will exhibit dimensional tolerances. However, for an efficient coupling between the cables 17 and 21, the distance between the end faces of the fiber ends shown in the connector 10 (see FIG. 1) may amount to at most a few micrometers.

In order to compensate for these dimensional tolerances, the pin holder 3 is arranged to be resilient so that the helical spring 67 always has to be compressed in order to enable the board 59 to be arranged in the cabinet 85. The length of the recess 73 in the protective cap 8 should be larger than the sum of all dimensional tolerances in order to ensure that the wire spring 71 always engages in this recess 73 after the board 59 has been completely slid into the cabinet 85. For example, if the bolts 99 are loosened to loosen the rail 97 in order to replace a board 59, all boards 59 will be pushed away from the rear wall 91 by the helical spring 67. Because the wire spring 71 engages the recess 73, the protective cap 8 and hence also the board 59 and the part of the connector 10 mounted thereon is retained. This offers the advantage that all couplings between the cables 17 and 21 on other boards are maintained when only one board 59 is replaced.

Figure 3:
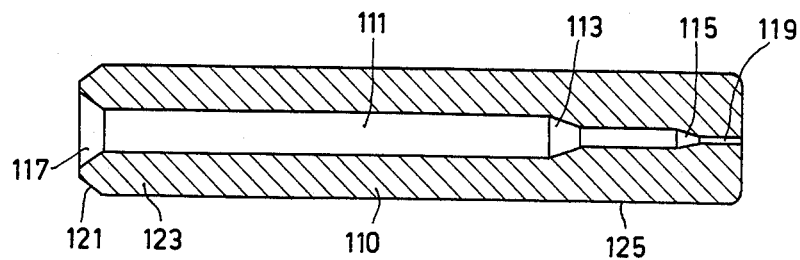
FIG. 3 is a sectional view of a fiber guide for use in a connector according to the invention.

Instead of three pins 5 and 7 clamped in each of the pin holders 1 and 3, four, five or six pins, or even a single pin can be secured in each of the pin holders 1 and 3. FIG. 3 is a sectional view of such a single pin 110. The pin 110 has a longitudinal bore 111 comprising two constricted portions 113 and 115 for introducing a fiber end easily and in a self locating manner into a coupling hole 119. Coupling hole 19 is only slightly larger than the diameter of the fiber end (approximately 125 μm). The fiber is introduced into pin 110 via a comparatively large funnel-shaped inlet opening 117 (diameter approximately 1 mm).

In order to facilitate the pressing of the end 123 of the pin 110 into the pin holder 1 or 3, an edge 121 is bevelled. A light-conductive core of an optical fiber to be secured in the pin 110 may exhibit some eccentricity with respect to the outer wall 125 of the pin 110. Therefore, it has been found that, after securing a fiber end, the outer wall 125 of the pin 110 is preferably worked by means of a device and a method as described U.S. Pat. No. 4,289,374 (corresponding to Netherlands Patent Application No. 7,809,725).

Figure 4:
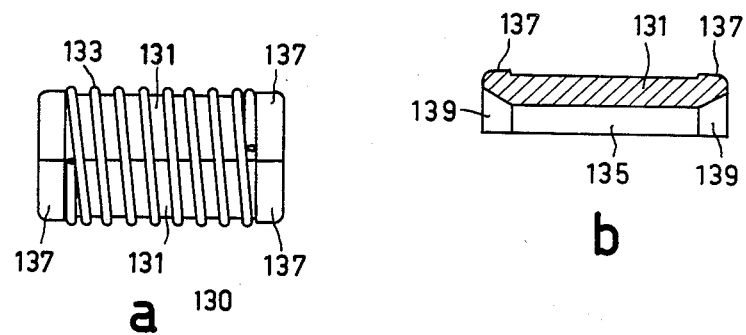
FIGS. 4a and 4b show an assembly and a part of a coupling means for use in a connector according to the invention.

Instead of a coupling means (element 9 in FIG. 1) which is cut open or not (the former is known from German Offenlegungsschrift No. 2,844,744), use can also be made of a composite coupling means 130 as shown in FIG. 4a. The coupling means 130 comprises two half coupling bushings 131, one of which is shown in a cross-sectional view in FIG. 4b, and a helical spring 133 which is arranged around the half coupling bushings 131 and which presses the bushings 131 against each other. The half coupling bushings 131 are manufactured by grinding down complete coupling bushings, so that two half coupling bushings 131 which are arranged one on the other. The two half coupling bushings together enclose a circularly cylindrical duct 135, and no gap remains between the two parts.

The diameter of the enclosed duct 135 (only half of which is shown in FIG. 4b) should be equal to the diameter of circumscribed circle of the pins 5 and 7 to be enclosed (FIG. 1) or to the diameter of the pin 110 (FIG. 3). Any tolerances can then be compensated for by pushing the two half coupling bushings 131 slightly away from each other by means of the pins, against the force of the helical spring 133 which is arranged on the bushings 131 between two collars 137. The bushings 131 comprise funnel-shaped inlet openings 139 to facilitate the insertion of the pins (5, 7 and 110) into the coupling means 130.

Figure 5:
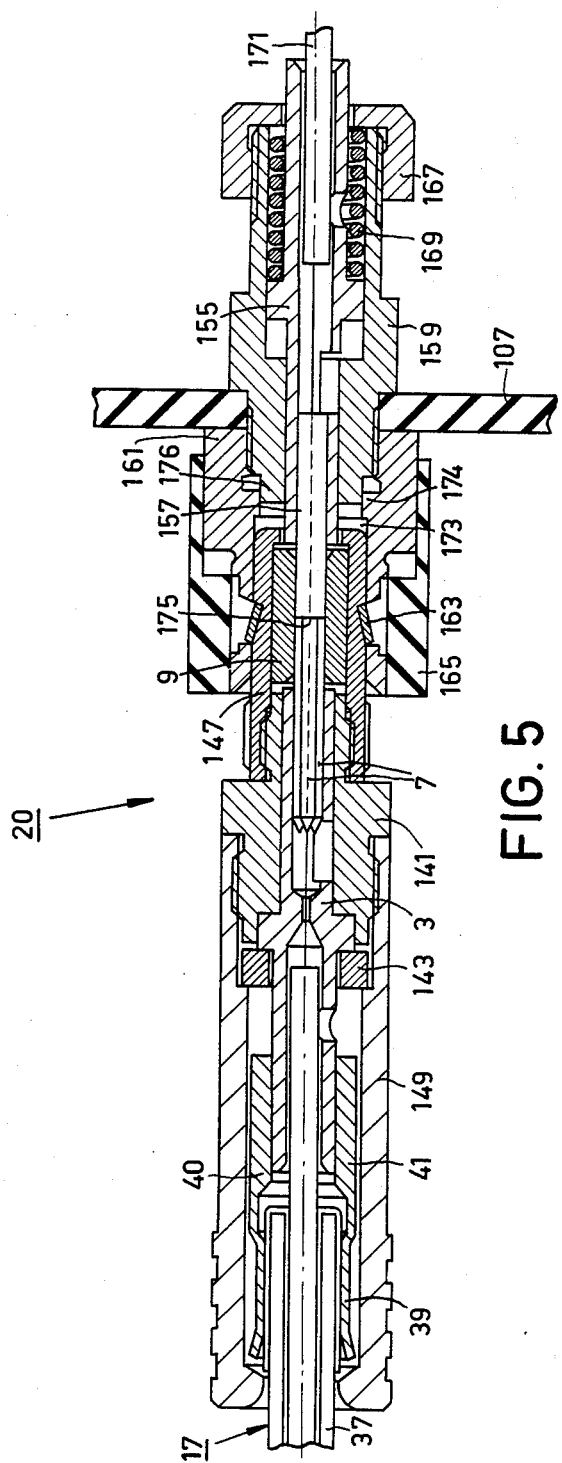
FIG. 5 is a longitudinal cross-sectional view of a second connector according to the invention.

The optical connector 20 shown in FIG. 5 is suitable for use in or on distribution panels such as used in signal transmission racks in telephone exchanges. The connector 20 can also be used on the front panels 107 of the boards 59 (FIG. 2) for tests required for maintenance and service.

The optical connector 20 of FIG. 5 can be compared with an electrical connector of the "socket and jack plug" type. The "socket" part of the connector 20 comprises a pin holder 3 with pins 7, a support 141, an intermediate ring 143, a coupling bushing 9, a protective cap 147, a handle 149 and a shrink piece 41 which is secured on the pin holder 3 and by means of which an optical cable 17 is connected thereto.

The other part of the connector 20 is secured to a distribution panel which may be the front plate 107 of FIG. 2. This other part of connector 20 comprises a pin holder 155 with one pin 157, a two-part support with a holder part 159 and a locking part 161, a locking spring 163, a sliding ring 165 yet to be described, a cap 167 and a helical spring 169.

The optical cables 17 and 171 are connected to the pin holders 3 and 155, respectively, by means of the method described with reference to FIG. 1. The pin holder 155 is resiliently mounted in the manner described with reference to FIG. 1. The "jack plug part" of the connector 20 is secured to the distribution panel 107 by means of the holder part 159 and the locking part 161. The locking part 161 comprises a rim 174 formed in a recess 173. In conjunction with a ridge 176 formed on the holder part 159, rim 174 coarsely centers the pin holder 155 arranged in the holder part 159 with respect to the recess 173.

The recess 173 forms a sliding fit with the protective cap 147. As a result, the pin holder 3 is precentered with respect to the pin holder 155, arranged in the holder part 159, when the protective cap 147 is inserted into the recess 173. The locking spring 163 yields when the protective cap 147 is inserted in recess 173. During further movement, the pin 157 is taken up in the coupling bushing 9 and is aligned. As soon as the end faces 175 of the pins 3 and 157 abut, the spring 169 will be compressed when the protective cap 147 is moved further.

When the protective cap 147 has been introduced sufficiently far into the support 161 and 159, the locking spring 163 engages in a notch provided in the protective cap 147, thus retaining the protective cap 147 after the release of the connector 20. The spring 163 is U-shaped and engages the notch of the protective cap 147 by way of its long sides.

The lock can be released as follows. The sliding ring 165 comprises a finger which presses the ends of the long sides of the locking spring 163 apart during the movement of the sliding ring 165 towards the distribution panel 107. The long sides of the spring 163 are then lifted out of the notch in the protective cap 147, so that this cap can be pulled out of the locking part 161 of the connector 20. The optical coupling between the cables 17 and 171 is then broken.

What is claimed is:

1. A detachable connector for coupling pairs of optical fibers, said connector comprising:
   first and second pin holders, each pin holder having a bore therein;
   first and second fiber guides having clamped ends and free ends, the clamped ends being clamped in the bores of the first and second pin holders, respectively, each of said fiber guides comprising at least one pin and having an elongate duct for accommodating an end of an optical fiber;
   means for coupling the first and second fiber guides, said coupling means being arranged on the free end of the second fiber guide and having a circularly cylindrical duct in which the free ends of both fiber guides are arranged and aligned when the connector is coupled;
   first and second supports in which the first and second pin holders, respectively, are secured, the first support having a recess with an inner surface in which the entire free end of the first fiber guide is located, the free end of the second fiber guide extending beyond the second support; and
   a protective cap, fully enclosing the coupling means and the free end of the second fiber guide, said cap having an opening in an end thereof for the insertion of the free end of the first fiber guide, the end of the protective cap projecting beyond the free end of the second fiber guide and having inwardly projecting means for retaining the coupling means on the free end of the second fiber guide, the protective cap having an outer surface with dimensions which match the dimensions of the inner surface of the recess in the first support.

2. A connector as claimed in claim 1, characterized in that:
   the first support comprises a lock spring; and
   the outer surface of the protective cap has a recess for engaging the lock spring when the connector is coupled.

3. A connector as claimed in claim 2, characterized in that the recess extends in the same direction as the duct in the second fiber guide.

4. A connector as claimed in claim 3, characterized in that at least one of the pin holders is resiliently mounted in its support in the direction of the duct of the fiber guide therein.

5. A connector as claimed in claim 4, characterized in that the pin holder has a bore with openings on both sides thereof.

6. A connector as claimed in claim 5, characterized in that:
- each fiber guide comprises three pins clamped in the bore of the pin holder; and
- each pin holder has a funnel-shaped inlet opening for introducing an end of an optical fiber into the duct in the fiber guide.

7. A connector as claimed in claim 3, characterized in that:
- at least one pin holder has a collar formed at approximately the center thereof;
- at least one support has a recess in which the collar and a part of the pin holder which is remote from the fiber guide are accommodated; and
- the connector further comprises a cap, closing the recess, and a compression spring clamped between the cap and the collar, the cap having an aperture for passing the remote end of the fiber guide therethrough.

8. A connector as claimed in claim 7, characterized in that the coupling means comprises two half-bushings arranged together to enclose a circularly cylindrical duct, the bushings being held together by a spring which encloses the bushings.

* * * * *